United States Patent
Mutikainen

(10) Patent No.: US 9,143,989 B2
(45) Date of Patent: Sep. 22, 2015

(54) SINGLE RADIO VOICE CALL CONTINUITY FOR EMERGENCY CALLBACK OR CLICK-TO-DIAL SESSIONS

(75) Inventor: Jari Kalevi Mutikainen, Lepsämä (FI)

(73) Assignee: Nokia Technologies Oy, Espoo (FI)

( * ) Notice: Subject to any disclaimer, the term of this patent is extended or adjusted under 35 U.S.C. 154(b) by 119 days.

(21) Appl. No.: 13/877,359

(22) PCT Filed: Oct. 5, 2010

(86) PCT No.: PCT/IB2010/054507
§ 371 (c)(1),
(2), (4) Date: Apr. 2, 2013

(87) PCT Pub. No.: WO2012/046100
PCT Pub. Date: Apr. 12, 2012

(65) Prior Publication Data
US 2013/0188607 A1 Jul. 25, 2013

(51) Int. Cl.
H04W 36/00 (2009.01)
H04W 4/22 (2009.01)
H04W 76/00 (2009.01)

(52) U.S. Cl.
CPC .......... *H04W 36/0022* (2013.01); *H04W 4/22* (2013.01); *H04W 76/007* (2013.01)

(58) Field of Classification Search
CPC . H04W 4/22; H04W 76/007; H04W 36/0022; H04W 80/10; H04L 65/1016; H04L 65/1069; H04L 65/40; H04L 65/1006; H04M 2242/04
USPC ........... 455/404.1, 404.2; 370/331, 352, 259; 379/45
See application file for complete search history.

(56) References Cited

U.S. PATENT DOCUMENTS 8,331,961 B1 * 12/2012 Mahdi ............................ 455/466
2007/0149166 A1 * 6/2007 Turcotte et al. ............ 455/404.1
(Continued)

FOREIGN PATENT DOCUMENTS

CN 101317493 A 12/2008
WO 2008151406 A1 12/2008

OTHER PUBLICATIONS

International Search Report received in corresponding Patent Cooperation Treaty Application No. PCT/IB2010/054507, dated Apr. 26, 2011. 4 pages.
(Continued)

*Primary Examiner* — Marcus R Smith
*Assistant Examiner* — Rose Clark
(74) *Attorney, Agent, or Firm* — Alston & Bird LLP

(57) ABSTRACT

An example apparatus is caused to receive a message inviting a user equipment (UE) to participate in an emergency communication session with an originating node, where the user equipment is registered with an Internet Protocol Multimedia Subsystem (IMS). The apparatus is caused to identify a type of registration of the UE with the IMS, and select a transfer function of the IMS to anchor the emergency communication session based on the identified type of registration of the user equipment with the IMS. The transfer function may be a domain transfer function or emergency access transfer function of the IMS. The apparatus is also caused to prepare the message for transmission to the selected transfer function to thereby enable the selected transfer function to anchor the emergency communication session and further communicate with one or more other components of the IMS to establish the emergency communication session with the user equipment.

12 Claims, 10 Drawing Sheets

(56) References Cited

U.S. PATENT DOCUMENTS

| | | | |
|---|---|---|---|
| 2008/0089486 | A1 | 4/2008 | Maoour et al. |
| 2009/0122793 | A1 | 5/2009 | Yang |
| 2010/0124897 | A1* | 5/2010 | Edge .......................... 455/404.1 |
| 2010/0311386 | A1* | 12/2010 | Edge et al. ................ 455/404.1 |
| 2011/0141979 | A1* | 6/2011 | Keller et al. .................. 370/328 |
| 2012/0083240 | A1* | 4/2012 | Patel .......................... 455/404.2 |

OTHER PUBLICATIONS

3GPP TS 23.237 V9.6.0 (Sep. 2010), 3rd Generation Partnership Project; Technical Specification Group Services and System Aspects; IP Multimedia Subsystem (IMS) Service Continuity; Stage 2 (Release 9); (Online); section 5. 89 pages.

3GPP TS 23.167 V9.4.0 (Mar. 2010), 3rd Generation Partnership Project; Technical Specification Group Services and System Aspects; IP Multimedia Subsystem (IMS) emergency sessions (Release 9): (Online); section 5 and 6. 38 pages.

Office Action from Argentina Patent Application No. 20110103667 dated Nov. 27, 2014.

Written Opinion from International Patent Application No. PCT/IB2010/054507 dated Apr. 26, 2011.

International Preliminary Report on Patentability from International Patent Application No. PCT/IB2010/054507 dated Apr. 9, 2013.

Office Action for Chinese Application No. 201080069455.9 dated Jun. 8, 2015.

* cited by examiner

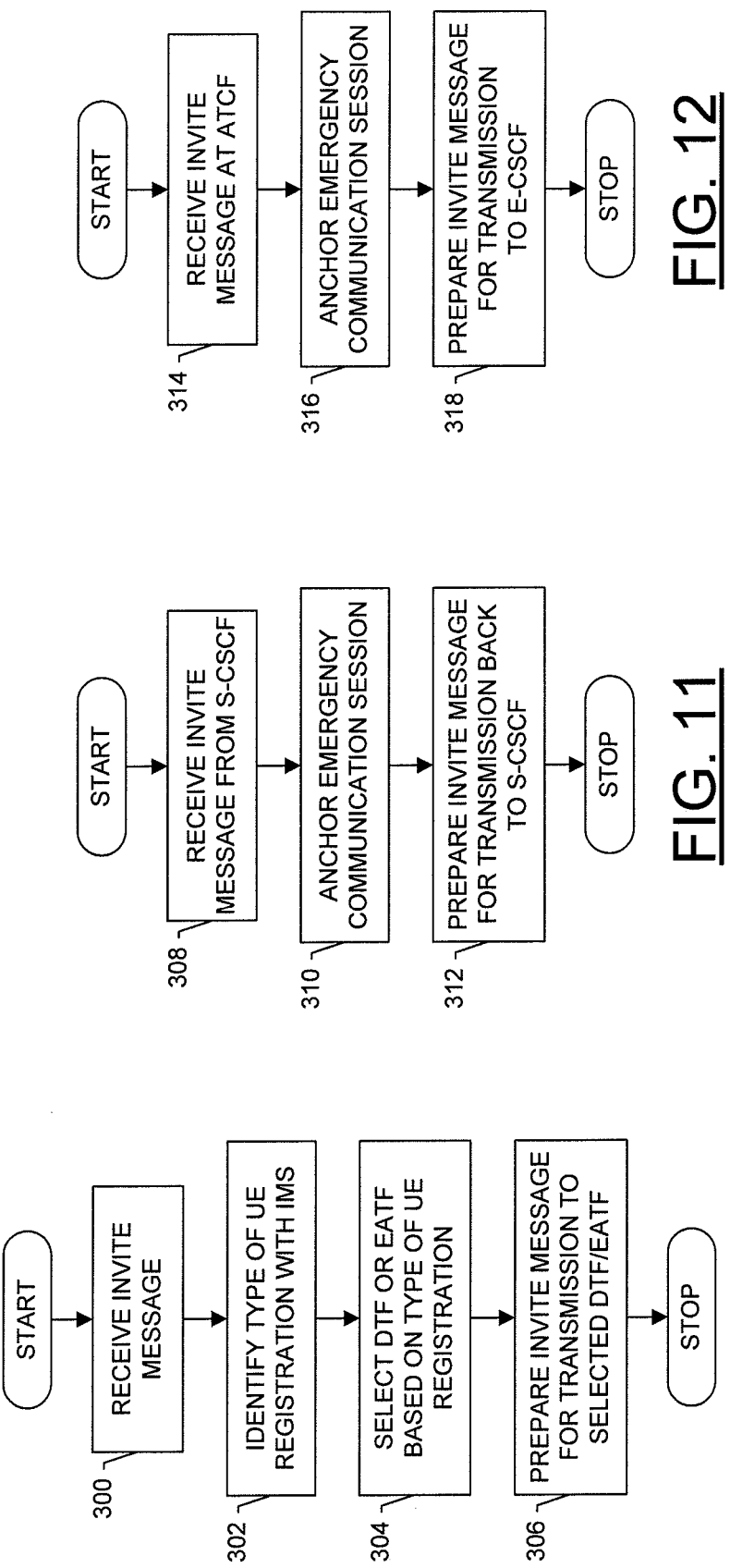

SINGLE RADIO VOICE CALL CONTINUITY FOR EMERGENCY CALLBACK OR CLICK-TO-DIAL SESSIONS

RELATED APPLICATION

This application was originally filed as PCT Application No. PCT/IB2010/054507 filed Oct. 5, 2010.

TECHNICAL FIELD

The present invention generally relates to single radio voice call continuity (SRVCC) and, more particularly, relates to SRVCC for emergency callback or click-to-dial sessions.

BACKGROUND

The modern communications era has brought about a tremendous expansion of wireline and wireless networks. Computer networks, television networks and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. For example, the Evolved Universal Mobile Telecommunications System (UMTS) Terrestrial Radio Access Network (E-UTRAN) is currently under development. The E-UTRAN, which is also known as Long Term Evolution (LTE), is aimed at upgrading prior technologies by improving efficiency, lowering costs, improving services, making use of new spectrum opportunities, and providing better integration with other open standards. A number of these new networking technologies include packet-switched (PS) networks, such as the 3rd Generation Partnership Program (3GPP) IP Multimedia Subsystem (IMS) network, which has adopted the Session Initiation Protocol (SIP) as the signaling protocol.

As these new networking technologies are deployed, coverage by the new networking technology may not be universal. In order to assure quality of service and avoid dropping of calls, the new networking technologies may be configured to coexist with legacy networking technologies, such as circuit-switched (CS) networks. In this regard, a mobile terminal (for example, user equipment—UE) may be handed over between, for example, an LTE network and a CS network. Single radio voice call continuity (SRVCC) functionality is being defined to enable a UE to perform an inter-domain handover from LTE to CS such that a voice over Internet Protocol (VoIP) session over IMS over the LTE access may be transferred to the CS network, such as when the LTE coverage is lost.

BRIEF SUMMARY

In various instances, an IMS emergency call session may be inadvertently released such as by the user or due to network failure. For this reason, the IMS may include emergency callback functionality whereby the public safety answering point (PSAP) facilitates callback to the same UE that originated a released emergency call session. As the IMS signaling protocol, however, SIP lacks a protocol extension to indicate such an emergency callback. As such, IMS currently may not be able to provide special treatment for the emergency callbacks. Similarly, while current SRVCC functionality supports emergency call sessions, it does not support emergency callbacks.

In light of the foregoing background, example embodiments of the present invention provide apparatuses, methods and computer-readable storage mediums for enabling single radio voice call continuity (SRVCC) functionality for emergency callbacks or click-to-dial sessions. Various aspects of example embodiments of the present invention are directed to apparatuses including at least one processor and at least one memory including computer program code. The memory/memories and computer program code are configured to, with processor(s), cause the apparatus to at least perform a number of operations.

The apparatus of one example embodiment may be configured to function as a serving call session (or state) control functions (S-CSCF), and may be caused to receive a message inviting a user equipment (UE) to participate in an emergency communication session with an originating node. The user equipment is registered with an Internet Protocol Multimedia Subsystem (IMS). And the originating node includes a public safety answering point (PSAP) inviting the user equipment to participate in an emergency callback session, or an application server (AS) inviting the user equipment to participate in an emergency click-to-dial session.

The apparatus of this example embodiment may also be caused to identify a type of registration of the UE with the IMS, and select a transfer function of the IMS to anchor the emergency communication session based on the identified type of registration of the user equipment with the IMS. The selected transfer function may include a domain transfer function (DTF) or an emergency access transfer function (EATF) of the IMS. The apparatus may also be caused to prepare the message for transmission to the selected transfer function to thereby enable the selected transfer function to anchor the emergency communication session and further communicate with one or more other components of the IMS to establish the emergency communication session with the user equipment.

The apparatus of another example embodiment may be configured to function as an EATF, and may be caused to receive a message inviting a UE to participate in an emergency communication session with an originating node, where the message is received from a S-CSCF of the IMS. The apparatus may be caused to anchor the emergency communication session at the emergency access transfer function. And the apparatus may be caused to prepare the message for transmission back to the S-CSCF to thereby enable the S-CSCF to further communicate with one or more other components of the IMS to establish the emergency communication session with the UE.

The apparatus of another example embodiment may be configured to function as an access transfer control function (ATCF) of an IMS, and may be caused to receive a message inviting a PSAP to participate in an emergency communication session with a UE, where the message is received from a proxy call session control function (P-CSCF) of the IMS. The apparatus may be caused to anchor the emergency communication session at the ATCF, and prepare the message for transmission from the ATCF to an emergency call session control function (E-CSCF). This may enable the E-CSCF to further communicate with the PSAP directly or via one or more other components of the IMS to establish the emergency communication session with the UE.

BRIEF DESCRIPTION OF THE DRAWINGS

Figure 1:
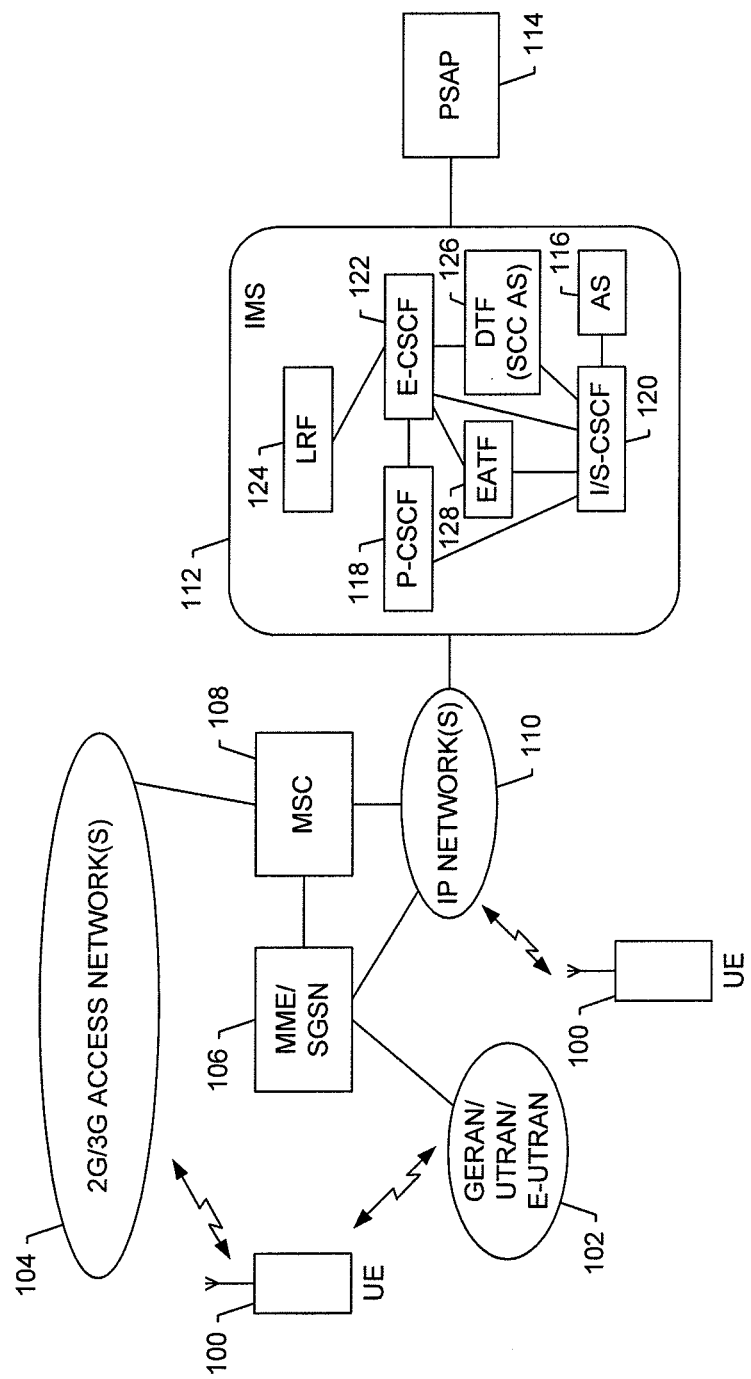
Figure 2:
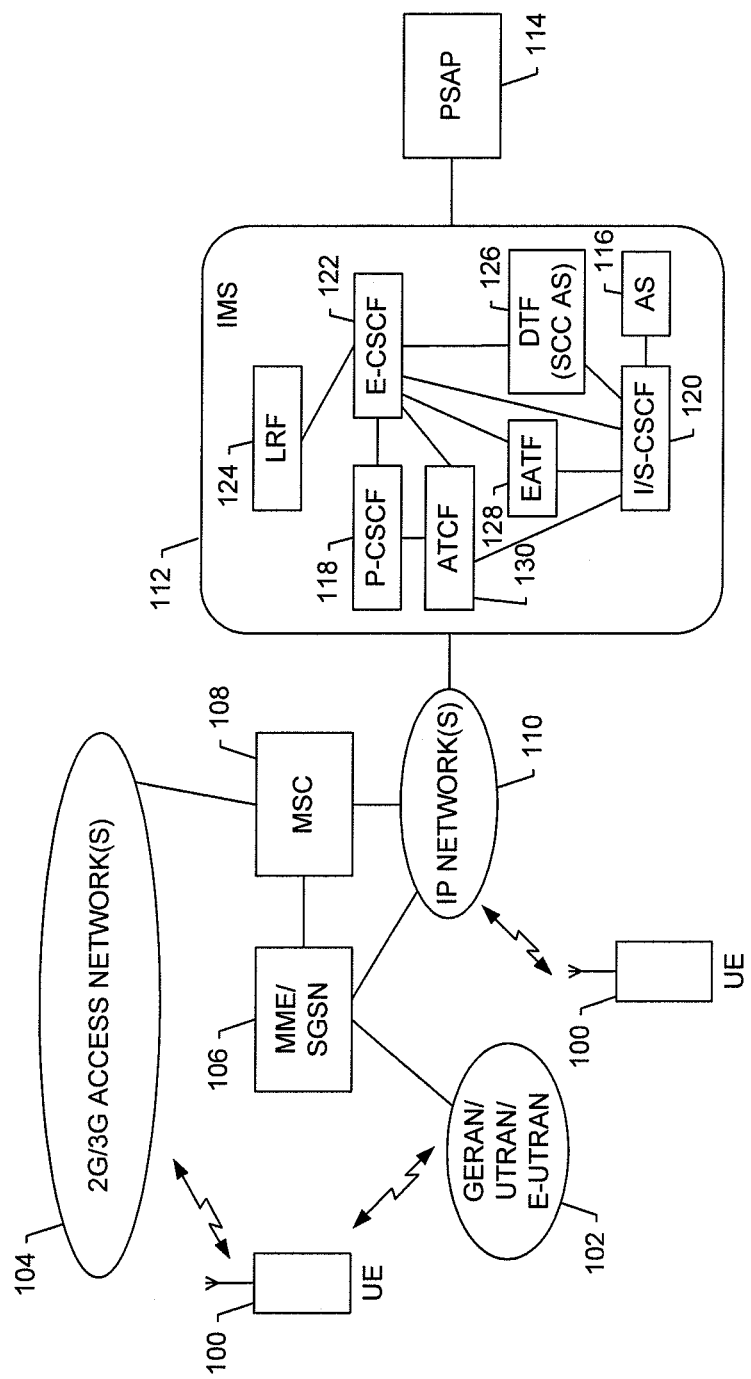
Figure 3:
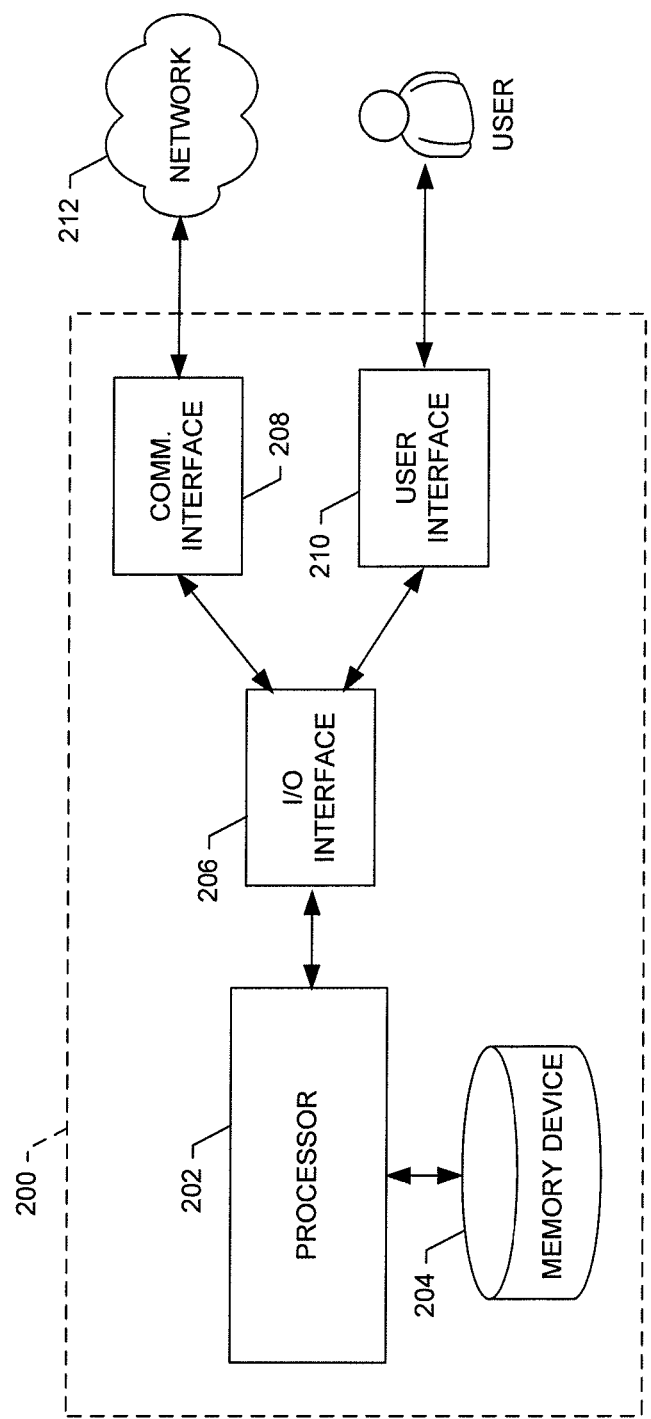
Figure 4:
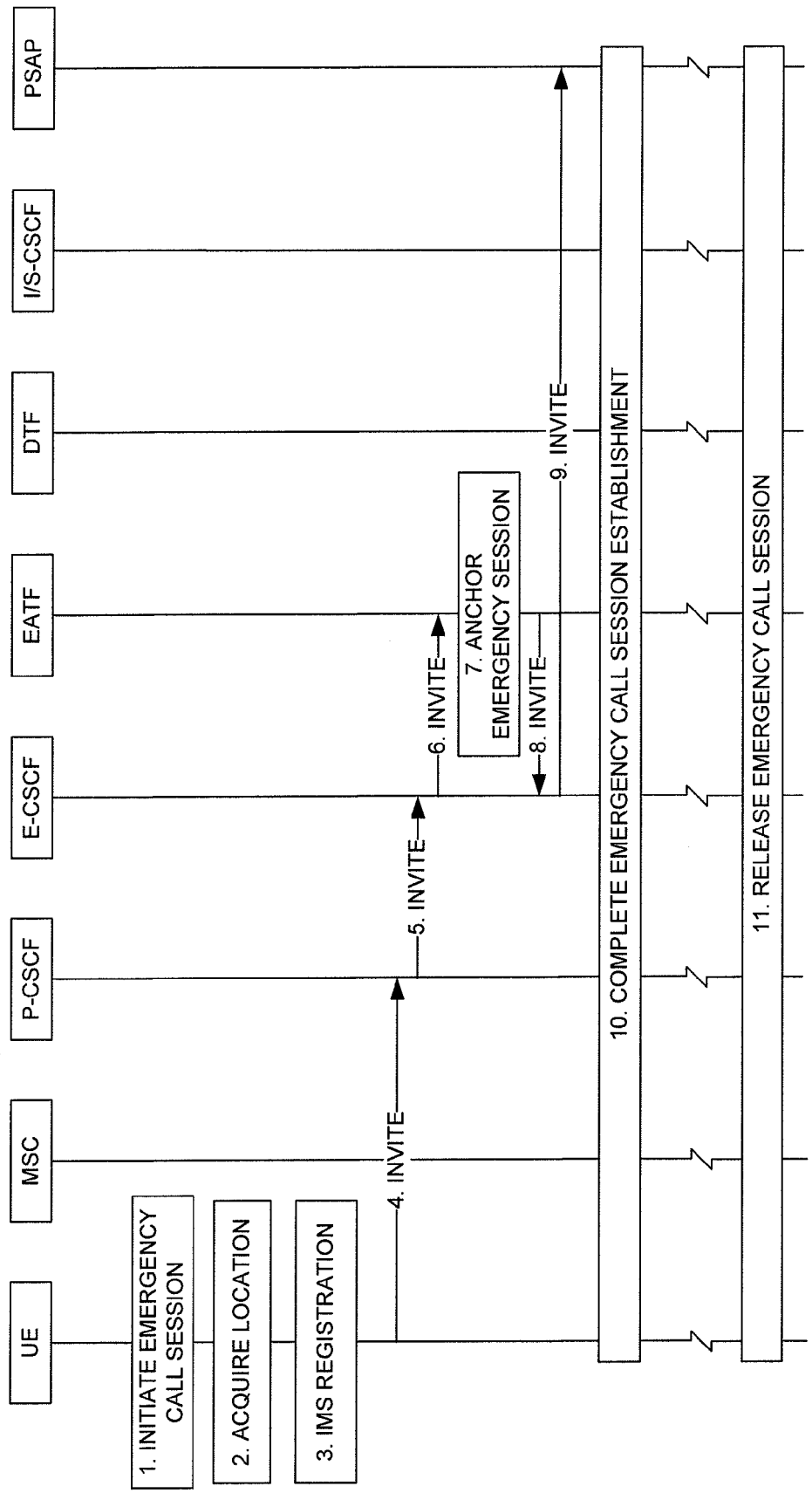
Figure 5:
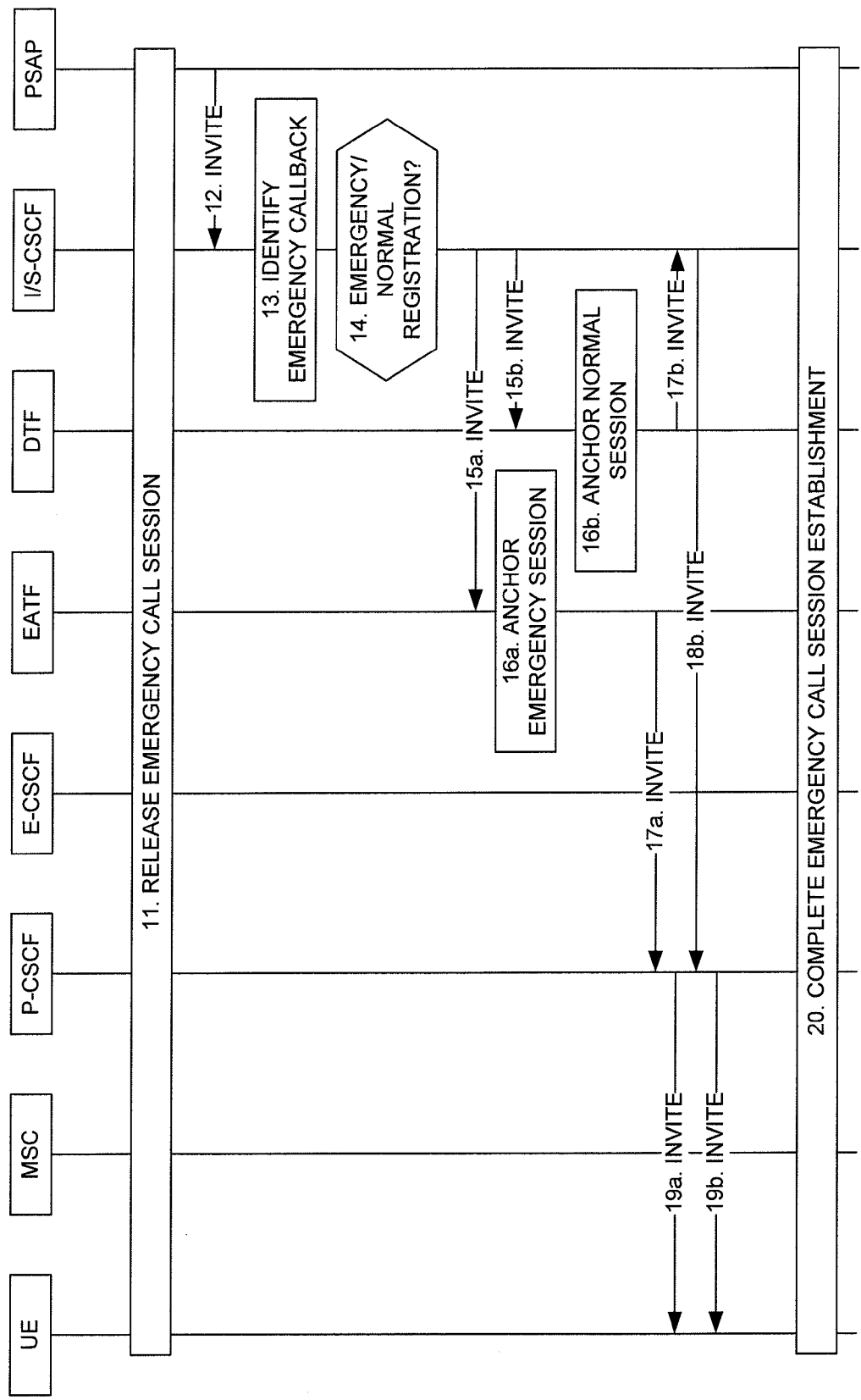
Figure 6:
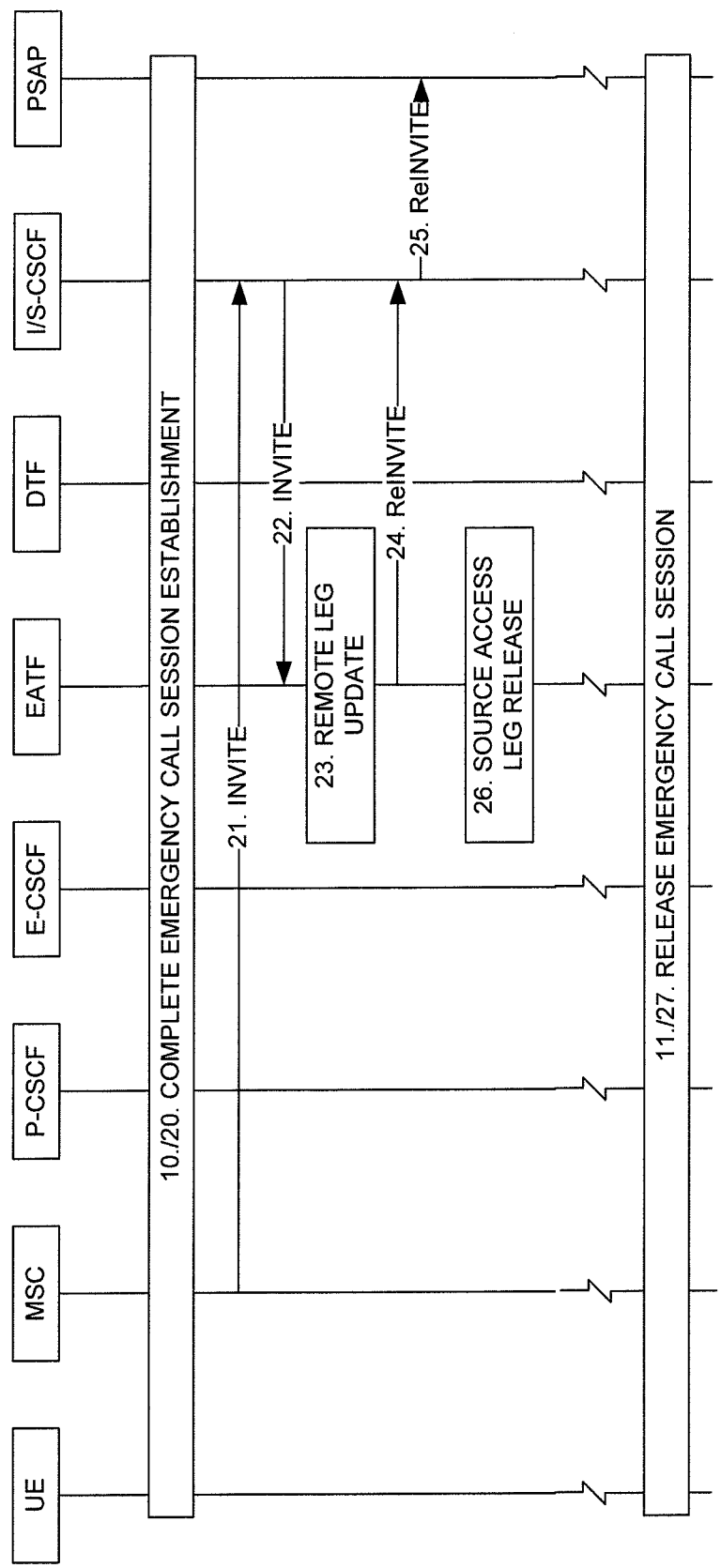
Figure 7:
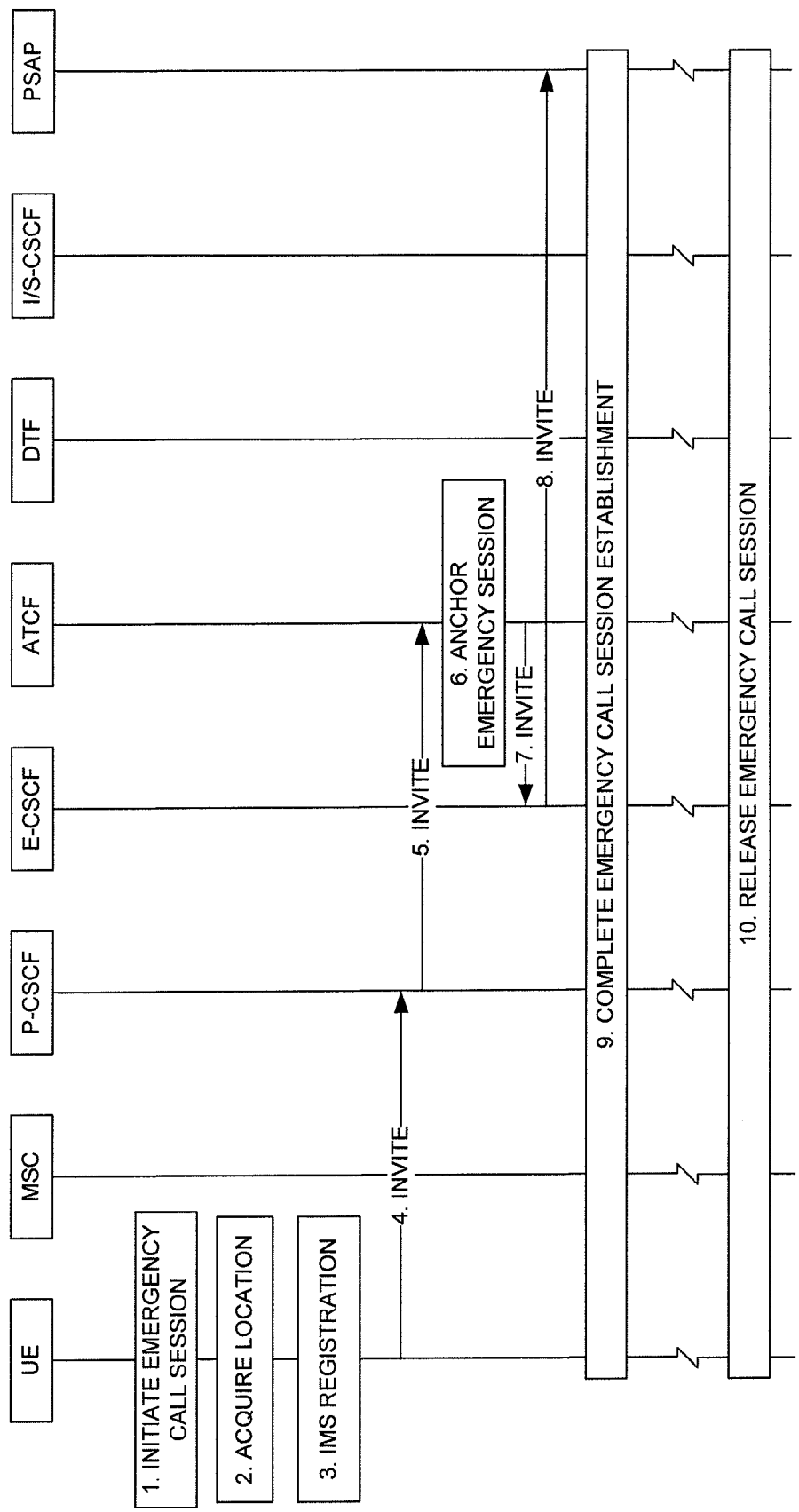
Figure 8:
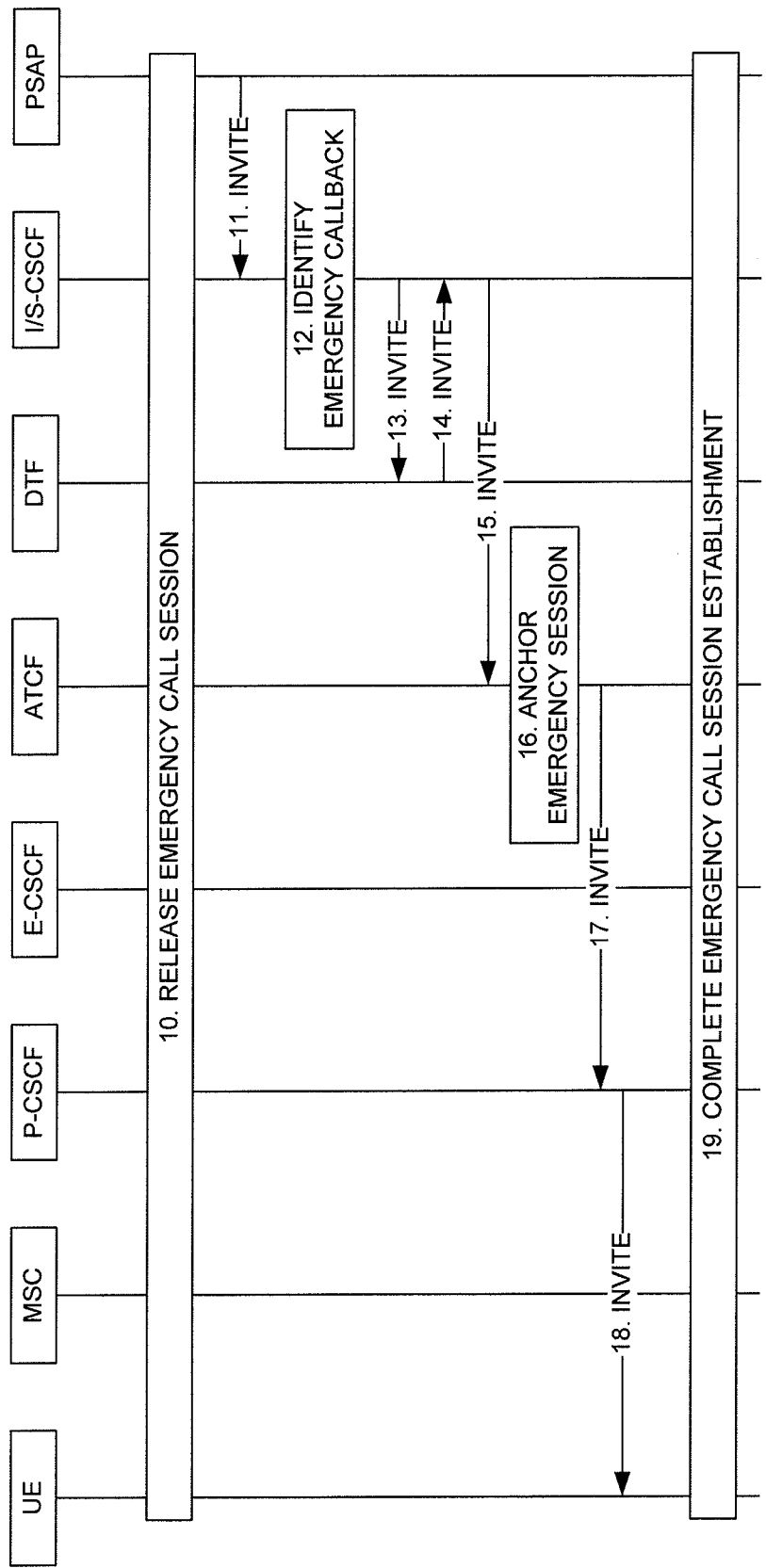
Figure 9:
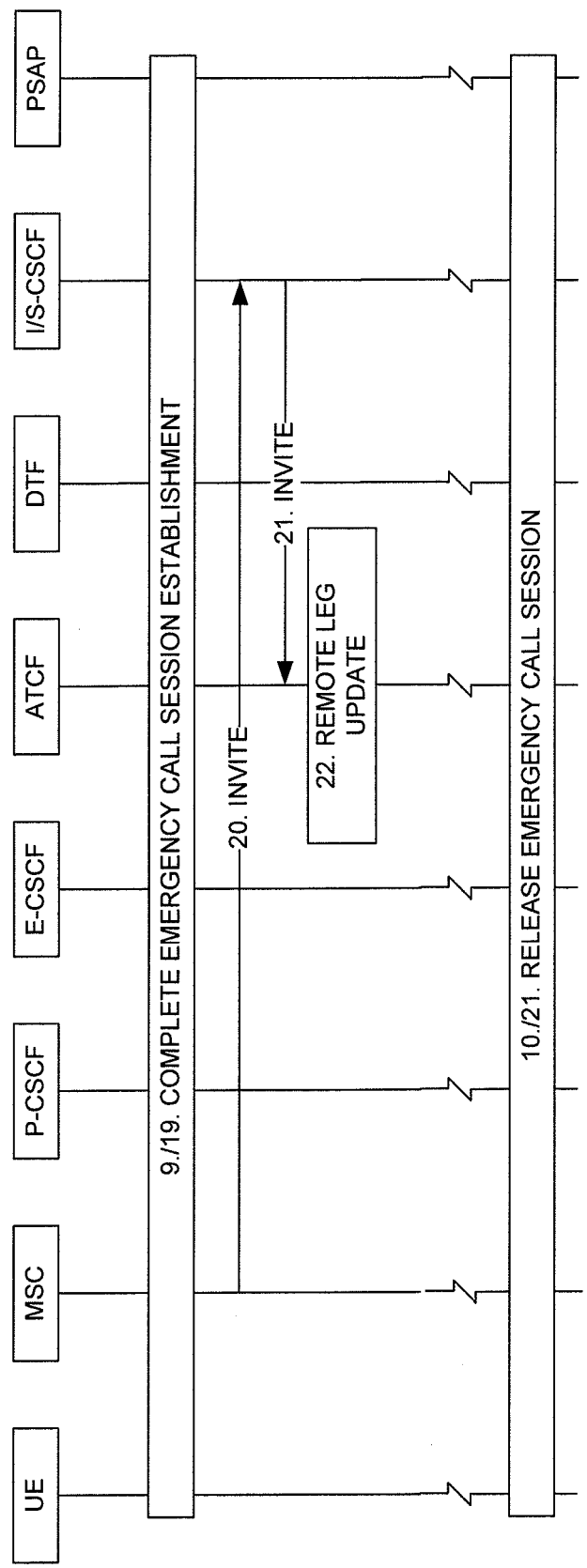

Having thus described the invention in general terms, reference will now be made to the accompanying drawings, which are not necessarily drawn to scale, and wherein:

FIGS. 1 and 2 are block diagrams of systems in accordance with example embodiments of the present invention;

FIG. 3 is a schematic block diagram of an apparatus that may be configured to function as one or more components of the systems of FIGS. 1 and 2 to perform example methods of the present invention;

FIGS. 4, 5 and 6 illustrate control flow diagrams of an IMS emergency call session, callback session and SRVCC functionality, respectively, in the context of the system of FIG. 1, according to example embodiments of the present invention;

FIGS. 7, 8 and 9 illustrate control flow diagrams of an IMS emergency call session, callback and SRVCC, respectively, in the context of the system of FIG. 2, according to example embodiments of the present invention; and FIGS. 10, 11 and 12 are flowcharts illustrating various operations in methods according to example embodiments of the present invention.

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Reference may be made herein to terms specific to a particular system, architecture or the like, but it should be understood that example embodiments of the present invention may be equally applicable to other similar systems, architectures or the like. For instance, example embodiments of the present invention may be shown and described herein in the context of cellular networks; but it should be understood that example embodiments of the present invention may be equally applied in other types of distributed networks, such as grid computing, pervasive computing, ubiquitous computing, peer-to-peer, cloud computing for Web service or the like.

The terms "data," "content," "information," and similar terms may be used interchangeably, according to some example embodiments of the present invention, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Further, as used herein, the term "circuitry" refers to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory/memories that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Further, as described herein, various messages or other communication may be transmitted or otherwise sent from one component or apparatus to another component or apparatus. It should be understood that transmitting a message or other communication may include not only transmission of the message or other communication, but may also include preparation of the message or other communication by a transmitting apparatus or various means of the transmitting apparatus.

Referring to FIG. 1, an illustration of one system that may benefit from the present invention is provided, in which the system may be referred to as a Single Radio Voice Call Continuity (SRVCC) emergency call support system. The system, method and computer program product of example embodiments of the present invention may operate in a number of different environments, including mobile and/or fixed environments, wireline and/or wireless environments, standalone and/or networked environments or the like. For example, the system, method and computer program product of example embodiments of the present invention can operate in mobile communication environments whereby mobile terminals operating within one or more mobile networks include or are otherwise in communication with one or more sources of video sequences.

As shown, the system may include one or more network devices and one or more mobile terminals (for example, user equipment—UE 100). The mobile terminals may be various different examples of mobile communication devices such as portable digital assistants (PDAs), pagers, mobile televisions, gaming devices, laptop computers, mobile phones, cameras, video recorders, audio/video players, radios, global positioning system (GPS) devices, or any combination of the aforementioned, and other types of voice, text and/or data communications devices. However, it should be understood that a mobile terminal as illustrated and hereinafter described is merely illustrative of one type of device that would benefit from embodiments of the present invention and, therefore, should not be taken to limit the scope of embodiments of the present invention.

The system may also include a number of different access networks including one or more GSM/Edge Radio Access Networks (GERANs), Universal Terrestrial Radio Access Networks (UTRANs) and/or Evolved UTRANs (E-UTRANs) 102, and/or one or more second generation (2G), third generation (3G) radio access networks 104 or the like. These networks may include or otherwise communicate with a Mobility Management Entity (MME) 106 (which may also be configured as a GPRS Support Node—SGSN), a Mobile Switching Center (MSC) 108 or the like for route calls, data or the like to and from the UEs via the respective access networks. The MME/SGSN, MSC and/or UE may be coupled to one or more data or Internet Protocol (IP) networks 110, such as one or more local area networks, wide area networks (for example, the Internet) or the like. The IP network may, in turn, be coupled to a 3rd Generation Partnership Program (3GPP) IP Multimedia Subsystem (IMS) 112. These networks and components may cooperate to enable support for a SRVCC emergency call session with a public safety answering point (PSAP) 114 in accordance with example embodiments of the present invention.

The IMS 112 may include one or more application servers (AS) 116 and an IMS core with a number of network entities known as servers. For example, the IMS core may include a home subscriber server (HSS) configured to function as a master database for a given user (UE 100), including subscription-related information to support network entities handling IMS-based calls/sessions. In this regard, the IMS core may also include a number of call session (or state) control functions (CSCFs) to handle different functions. The CSCFs may be divided into various categories such as a proxy CSCF (P-CSCF) 118, interrogating/serving CSCF (I/S-CSCF) 120 and/or emergency CSCF (E-CSCF) 122. Briefly, the P-CSCF provides the terminals with a gateway or entry point into the IMS core. The I/S-CSCF, which may alternatively be separate components, operates as the authentication contact point within the IMS core for connections to terminals (the interrogating function), and performs the session control services for the terminals, providing the call intelligence and business logic (the serving function). The E-CSCF performs emergency session processing and routing, and may employ a location retrieval function (LRF) 124 to retrieve location information of the UE 100 that has initiated an emergency session. This information may include, for example, routing information and other parameters necessary for emergency services, which may be subject to local regulation.

The IMS 112 may further include an application server referred to as a domain transfer function (DTF) or service centralization and continuity application server (SCC AS) 126, to which IMS sessions may be anchored to enable service continuity for the user during transition between two access networks. A similar anchoring function in IMS emergency sessions may be provided by an emergency access transfer function (EATF) 128, which may also be referred to as an emergency SCC-AS (E-SCC-AS).

The system shown in FIG. 1 supports SRVCC emergency calls. It should be understood, however, that example embodiments of the present invention may equally support an enhanced SRVCC (eSRVCC) emergency calls. An example system according to these example embodiments is shown in FIG. 2. The components of the system shown in FIG. 2 are similar to those shown in FIG. 1, but additionally may include an access transfer control function (ATCF) 130 and access transfer gateway (ATGW), which may provide additional service continuity functions. For more information on one example eSRVCC architecture, see 3GPP change request (CR) document 23.237 CR 0317 (WG No. S2-103711), entitled: *SRVCC Enhancements for Voice Interruption Optimization* (Aug. 24, 2010).

Reference is now made to FIG. 3, which illustrates an apparatus 200 that may be configured to function as one or more components of the systems of FIGS. 1 and 2 to perform example methods of the present invention. These components may include, for example, the UE 100, MME/SGSN 106, MSC 108, PSAP 114, AS 116, P-CSCF 118, WS-CSCF 120, E-CSCF 122, LRF 124, DTF (SCC AS) 126, EATF 128 and/or ATCF 130. Although shown as separate components, in some example embodiments, an apparatus may support more than one component, logically separated but co-located within the apparatus. For example, a single apparatus may support a logically separate, but co-located, MSC, P-CSCF and/or ATCF.

In some example embodiments, the apparatus 200 may be embodied as, or included as a component of, a communications device with wired or wireless communications capabilities. The example apparatus may include or otherwise be in communication with one or more processors 202, memory devices 204, Input/Output (I/O) interfaces 206, communications interfaces 208 and/or user interfaces 210 (one of each being shown). Depending on the component of FIG. 1 being implemented by the apparatus, however, the apparatus may include additional elements and/or may not include one or more of the foregoing elements, such as the user interfaces.

The processor 202 may be embodied as various means for implementing the various functionalities of example embodiments of the present invention including, for example, one or more of a microprocessor, a coprocessor, a controller, a special-purpose integrated circuit such as, for example, an ASIC (application specific integrated circuit), an FPGA (field programmable gate array), DSP (digital signal processor), or a hardware accelerator, processing circuitry or other similar hardware. According to one example embodiment, the processor may be representative of a plurality of processors, or one or more multi-core processors, operating individually or in concert. A multi-core processor enables multiprocessing within a single physical package. Examples of a multi-core processor include two, four, eight, or greater numbers of processing cores. Further, the processor may be comprised of a plurality of transistors, logic gates, a clock (for example, oscillator), other circuitry, and the like to facilitate performance of the functionality described herein. The processor may, but need not, include one or more accompanying digital signal processors (DSPs). A DSP may, for example, be configured to process real-world signals in real time independent of the processor. Similarly, an accompanying ASIC may, for example, be configured to perform specialized functions not easily performed by a more general purpose processor. In some example embodiments, the processor is configured to execute instructions stored in the memory device or instructions otherwise accessible to the processor. The processor may be configured to operate such that the processor causes the apparatus to perform various functionalities described herein.

Whether configured as hardware alone or via instructions stored on a computer-readable storage medium, or by a combination thereof, the processor 202 may be an apparatus configured to perform operations according to embodiments of the present invention while configured accordingly. Thus, in example embodiments where the processor is embodied as, or is part of, an ASIC, FPGA, or the like, the processor is specifically configured hardware for conducting the operations described herein. Alternatively, in example embodiments where the processor is embodied as an executor of instructions stored on a computer-readable storage medium, the instructions specifically configure the processor to perform the algorithms and operations described herein. In some example embodiments, the processor is a processor of a specific device configured for employing example embodiments of the present invention by further configuration of the processor via executed instructions for performing the algorithms, methods, and operations described herein.

The memory device 204 may be one or more computer-readable storage media that may include volatile and/or non-volatile memory. In some example embodiments, the memory device may include Random Access Memory (RAM) including dynamic and/or static RAM, on-chip or off-chip cache memory, and/or the like. Further, the memory device may include non-volatile memory, which may be embedded and/or removable, and may include, for example, Read-Only Memory (ROM), flash memory, magnetic storage devices (for example, hard disks, floppy disk drives, magnetic tape, etc.), optical disc drives and/or media, non-volatile random access memory (NVRAM), and/or the like. The memory device may include a cache area for temporary storage of data. In this regard, at least a portion or the entire memory device may be included within the processor 202.

Further, the memory device 204 may be configured to store information, data, applications, computer-readable program code instructions, and/or the like for enabling the processor 202 and the example apparatus 200 to carry out various functions in accordance with example embodiments of the present invention described herein. For example, the memory device may be configured to buffer input data for processing by the processor. Additionally, or alternatively, the memory device may be configured to store instructions for execution by the processor. The memory may be securely protected, with the integrity of the data stored therein being ensured. In this regard, data access may be checked with authentication and authorized based on access control policies.

The I/O interface 206 may be any device, circuitry, or means embodied in hardware, software or a combination of hardware and software that is configured to interface the processor 202 with other circuitry or devices, such as the communications interface 208 and/or the user interface 210. In some example embodiments, the processor may interface with the memory device via the I/O interface. The I/O interface may be configured to convert signals and data into a form that may be interpreted by the processor. The I/O interface may also perform buffering of inputs and outputs to support the operation of the processor. According to some example embodiments, the processor and the I/O interface may be combined onto a single chip or integrated circuit configured to perform, or cause the apparatus 200 to perform, various functionalities of an example embodiment of the present invention.

The communication interface 208 may be any device or means embodied in hardware, software or a combination of hardware and software that is configured to receive and/or transmit data from/to one or more networks 212 and/or any other device or module in communication with the example apparatus 200. The processor 202 may also be configured to facilitate communications via the communications interface by, for example, controlling hardware included within the communications interface. In this regard, the communication interface may include, for example, one or more antennas, a transmitter, a receiver, a transceiver and/or supporting hardware, including, for example, a processor for enabling communications. Via the communication interface, the example apparatus may communicate with various other network elements in a device-to-device fashion and/or via indirect communications.

The communications interface 208 may be configured to provide for communications in accordance with any of a number of wired or wireless communication standards. The communications interface may be configured to support communications in multiple antenna environments, such as multiple input multiple output (MIMO) environments. Further, the communications interface may be configured to support orthogonal frequency division multiplexed (OFDM) signaling. In some example embodiments, the communications interface may be configured to communicate in accordance with various techniques including, as explained above, any of a number of second generation (2G), third generation (3G), fourth generation (4G) or higher generation mobile communication technologies, radio frequency (RF), infrared data association (IrDA) or any of a number of different wireless networking techniques. The communications interface may also be configured to support communications at the network layer, possibly via Internet Protocol (IP).

The user interface 210 may be in communication with the processor 202 to receive user input via the user interface and/or to present output to a user as, for example, audible, visual, mechanical or other output indications. The user interface may include, for example, a keyboard, a mouse, a joystick, a display (for example, a touch screen display), a microphone, a speaker, or other input/output mechanisms. Further, the processor may comprise, or be in communication with, user interface circuitry configured to control at least some functions of one or more elements of the user interface. The processor and/or user interface circuitry may be configured to control one or more functions of one or more elements of the user interface through computer program instructions (for example, software and/or firmware) stored on a memory accessible to the processor (for example, the memory device 204). In some example embodiments, the user interface circuitry is configured to facilitate user control of at least some functions of the apparatus 200 through the use of a display and configured to respond to user inputs. The processor may also comprise, or be in communication with, display circuitry configured to display at least a portion of a user interface, the display and the display circuitry configured to facilitate user control of at least some functions of the apparatus.

In some cases, the apparatus 200 of example embodiments may be implemented on a chip or chip set. In an example embodiment, the chip or chip set may be programmed to perform one or more operations of one or more methods as described herein and may include, for instance, one or more processors 202, memory devices 204, I/O interfaces 206 and/or other circuitry components incorporated in one or more physical packages (for example, chips). By way of example, a physical package may include an arrangement of one or more materials, components, and/or wires on a structural assembly (for example, a baseboard) to provide one or more characteristics such as physical strength, conservation of size, and/or limitation of electrical interaction. It is contemplated that in certain embodiments the chip or chip set can be implemented in a single chip. It is further contemplated that in certain embodiments the chip or chip set can be implemented as a single "system on a chip." It is further contemplated that in certain embodiments a separate ASIC may not be used, for example, and that all relevant operations as disclosed herein may be performed by a processor or processors. A chip or chip set, or a portion thereof, may constitute a means for performing one or more operations of one or more methods as described herein.

In one example embodiment, the chip or chip set includes a communication mechanism, such as a bus, for passing information among the components of the chip or chip set. In accordance with one example embodiment, the processor 202 has connectivity to the bus to execute instructions and process information stored in, for example, the memory device 204. In instances in which the apparatus 200 includes multiple processors, the processors may be configured to operate in tandem via the bus to enable independent execution of instructions, pipelining, and multithreading. In one example embodiment, the chip or chip set may include one or more processors and software and/or firmware supporting and/or relating to and/or for the one or more processors.

Returning now to FIGS. 1 and 2, as defined by 3GPP, normal, non-emergency voice call sessions and emergency call sessions may be distinguished in the MME/SGSN 106, whereby use of a emergency packet data network (PDN) connection and emergency access point name (APN) may indicate to the MME that the voice bearer (quality of service class identifier (QCI)=1) being used by a UE 100 is for an IMS emergency call session. When the UE initiates the IMS emergency call session (for example, in instances in which the UE is not already IMS registered or in its home IMS), the UE creates an emergency PDN connection, and performs an IMS emergency registration. The UE then initiates the IMS emergency session, which is routed via the P-CSCF 118 to the E-CSCF 122 and EATF 128 in the IMS core, and finally to the PSAP 114. In this process, the EATF may anchor the SIP session to enable service continuity during the emergency call session.

When SRVCC functionality is invoked for an emergency call session, the MME/SGSN 106 indicates to the MSC 108 that the SRVCC is for an emergency call. The MSC then initiates the SRVCC with a SRVCC session transfer request that uses, as a destination address, an emergency session transfer number for SRVCC (E-STN-SR) instead of a normal, non-emergency session transfer number for SRVCC (STN-SR). The E-STN-SR is locally configured to the MSC and points to the local (visited) IMS 112, or more particularly, the EATF of the local IMS. Once the EATF receives the SRVCC session transfer request, the EATF correlates the transfer request to the anchored IMS emergency session, and updates the remote leg (call control leg between the EATF and PSAP) with the new IP address for media. For more information on this process, see 3GPP TS 23.216, TS 23.167 and TS 23.237.

By comparison to an IMS emergency call session, a normal, non-emergency IMS call session uses the DTF 126 in the home IMS 112 to anchor the session and thereby enable service continuity. For clarity, FIGS. 1 and 2 do not distinguish between the home IMS and local or visited IMS. When SRVCC functionality is invoked for a normal, non-emergency call session, the MSC 108 receives (via the MME/SGSN 106) the STN-SR from the home subscriber server (HSS) of the home IMS. This STN-SR points to the DTF in the home IMS, and the MSC uses it as a destination address in the SRVCC transfer request.

As explained in the background section, in various instances, an IMS emergency call session may be inadvertently released such as by the user or due to network failure. For this reason, the IMS may include emergency callback functionality whereby the PSAP facilitates callback to the same UE that originated a released emergency call session. An emergency callback is routed from the PSAP 114 to the I/S-CSCF 120 in the home IMS of the destined UE 100. Traditionally, the I/S-CSCF is not able to distinguish the emergency callback and a normal terminating call, and anchors the session to the DTF 126 and routes the call to the UE via the P-CSCF 118. In instances in which the UE 100 used a normal, non-emergency PDN connection and APN to setup the call session (for example, when the UE in its home network had already IMS registered before initiating the emergency session), the SRVCC functionality may be successfully performed. In these instances, the SRVCC functionality can be offered as for any normal, non-emergency call session, with the network even possibly being unaware that the call is in fact an emergency callback.

On the other hand, in instances in which the UE 100 used an emergency PDN connection and APN to setup the call session, the UE may remain registered to the IMS 112 via the IMS emergency registration. In these instances, the UE may not have a concurrent normal, non-emergency IMS registration or PDN connection. Then, when the I/S-CSCF 120 receives the incoming call from the PSAP 114, there are two possibilities. In the first possibility, the I/S-CSCF is not able to identify the call is an emergency callback from the PSAP, in which case the call cannot be routed to the UE as the emergency PDN connection can only be used for emergency calls. In the second possibility, the I/S-CSCF is able to identify the call is an emergency callback from the PSAP, in which case the I/S-CSCF has no means to route the call to the EATF 128 (which is in the visited network in a roaming situation), in order to anchor the emergency callback session.

Issues similar to those explained above may also apply to emergency click-to-dial functionality in which an emergency call session may be initiated by an IMS AS 116 on behalf of a UE 100 (for example, non-roaming UE). In this context, for example, the UE may initiate a click-to-dial session with an IMS AS using some unspecified mechanism, such as a hypertext transfer protocol (HTTP) request responsive to a user's clicking a link in a web page. The IMS AS then initiates an outgoing call session towards the PSAP 114, and an incoming call towards the UE 100. The IMS AS ties the call legs together using third party call control procedures such that the UE and PSAP may communicate when both have answered the call. For more information on one example click-to-dial functionality, see 3GPP change request (CR) document 23.167 CR 0177 (WG No. S2-103627), entitled: Alternative Emergency Session Handling in Non-Roaming Cases (Aug. 23, 2010). There are currently no means to provide SRVCC functionality for click-to-dial sessions from the IMS AS to the UE.

In view of the foregoing, example embodiments of the present invention provide SRVCC functionality for emergency callback or click-to-dial sessions. FIGS. 4, 5 and 6 illustrate control flow diagrams of an IMS emergency call session, callback session and SRVCC functionality, respectively, in the context of the system of FIG. 1, according to example embodiments of the present invention. Similarly, FIGS. 7, 8 and 9 illustrate control flow diagrams of an IMS emergency call session, callback and SRVCC, respectively, in the context of the system of FIG. 2, according to example embodiments of the present invention.

Turning now to the IMS emergency call session of FIG. 4, and with reference to the system of FIG. 1, in a process, phase, routine or operation (generally an "operation") 1, the user or UE 100 initiates an emergency call. In operation 2, the UE determines its own location or location identifier or obtains location information from an IP-based controller area network (IP-CAN).

In various instances, the UE 100 may have already established a PDN connection using an appropriate APN and registered to an IMS 112, and may be located in the respective home IMS. In other instances, however the UE may not have established a PDN or registered to an IMS, or may be located in a visited IMS instead of its home IMS. In these other instances, the UE may establish an emergency PDN connection using an appropriate emergency APN. Then, in operation 3, the UE 100 discovers a P-CSCF 118 in either a visited or home IMS, such as according to 3GPP standards. The UE then initiates an IMS emergency registration by sending a message such as a SIP REGISTER message to the P-CSCF, which continues the emergency registration with the home IMS.

In operation 4, the UE 100 sends a message to invite a PSAP 114 to participate in a communication (for example, emergency) session with the UE, such as a SIP INVITE message with an emergency indication. The INVITE message may optionally include any location information possessed by the UE.

In operation 5, a P-CSCF 118 receives the INVITE message and identifies it as being for an emergency call session based on the emergency indication, and in response, selects an E-CSCF 122 and forwards the INVITE message to the selected E-CSCF. Then, in operation 6, the E-CSCF sends the message to the EATF 128. In operation 7, the EATF anchors the emergency session (for example, it inserts itself in the signaling path which invokes a third-party call control for enablement of domain transfers for the call). The EATF then creates a new INVITE message and sends it back to the E-CSCF 122 in operation 8.

In operation 9, the E-CSCF 122 may verify any location information from the UE 100 and may obtain additional location information (for example, from an associated LRF 124). Based on this location information, the E-CSCF may select an appropriate PSAP 114 and forward the INVITE message to the respective PSAP. In this regard, in instances in which the PSAP is located in a public-switched telephone network (PSTN) or circuit-switched (CS) domain, the E-CSCF may forward the INVITE message to a media gateway control function (MGCF) or media gateway (MGW) which, in turn, may send an initial address message (IAM) to the PSAP. Alternatively, in instances in which the PSAP is located in a packet-switched (PS) domain, the E-CSCF may forward the INVITE message directly to the PSAP. The emergency call establishment is completed in operation 10, and is sometime thereafter released in operation 11.

FIG. 5 illustrates an emergency callback session according to example embodiments of the present invention, such as when an emergency call session has been unintentionally released. Although principally described in the context of an emergency callback session, as indicated above, a similar process may be applied to an emergency click-to-dial session—particular aspects of which will be interjected in the description of FIG. 5.

As shown in FIG. 5, in response to or after release of an emergency call session between a UE 100 and PSAP 114, in operation 12, the PSAP sends a SIP INVITE message with an emergency indication to the UE. In the context of an emergency click-to-dial session, operation 12 may include an appropriate AS 116 (acting on behalf of a UE) initiating an incoming call toward the UE by sending a SIP INVITE message to the UE. Similar to the message from the PSAP, this INVITE message from the AS may similarly include an emergency indication.

In operation 13, an I/S-CSCF 120 receives the INVITE message and identifies it as being for an emergency call session based on the emergency indication. Then, in operation 14, the I/S-CSCF determines whether to anchor the call session in the EATF 128 or DTF 126. In instances in which the UE is registered via IMS emergency registration, the I/S-CSCF selects the EATF. Otherwise, if the UE is not emergency registered but registered via normal, non-emergency IMS registration, and the user has an SRVCC subscription, the I/S-CSCF selects the DTF to anchor the session. Likewise, if the I/S-CSCF cannot identify the call session as an emergency callback session (or emergency click-to-dial session), the I/S-CSCF selects the DTF to anchor the session if the user has a SRVCC subscription.

In operations 15a, 15b, the I/S-CSCF 120 forwards the INVITE message to the selected transfer function, namely the EATF 128 or DTF 126. The I/S-CSCF may know or otherwise learn the network addresses of the EATF and DTF in any of a number of different manners. For example, the S-CSCF may execute initial Filter Criteria (iFC), and the DTF may be pre-configured such that the S-CSCF sends incoming voice sessions to the DTF. The iFC may include the address of the DTF and the triggers as to when to send an INVITE message to DTF, such as when it is a voice session.

In one example embodiment, the I/S-CSCF may learn the address of the EATF (in the visited IMS in a roaming situation) during IMS emergency registration of the UE 100. Traditionally, IMS emergency registration includes the P-CSCF 118 sending an IMS emergency registration request (SIP REGISTER with emergency indicator) to the WS-CSCF 120, and does not involve E-CSCF 122. In accordance with an example embodiment, the P-CSCF may send the emergency REGISTER to the E-CSCF, whose address may be preconfigured to the P-CSCF. The E-CSCF may add itself to the session path for upcoming SIP dialogs, or forward the registration to EATF to add itself to the session path. The E-CSCF or EATF may then send the emergency REGISTER further to the I/S-CSCF (as P-CSCF traditionally does). Incoming and outgoing emergency INVITE messages may then be routed via the E-CSCF or EATF (for example, from P-CSCF to E-CSCF to I/S-CSCF, or vice versa). Thus, the I/S-CSCF may forward the INVITE message to the EATF directly or indirectly via the E-CSCF when the WS-CSCF selects the EATF to anchor the emergency callback session (or emergency click-to-dial session).

In operations 16a, 16b, the selected transfer function (EATF 128 or DTF 126) anchors the emergency session. In operation 17a, in instances in which the EATF is the selected transfer function, the EATF creates a new INVITE message and sends it to the E-CSCF 122 or P-CSCF 118 which, in operation 19a, forwards the INVITE message to the UE 100 (the EATF, for example, sending the INVITE message to the P-CSCF directly or via the E-CSCF). In operation 17b, in instances in which the DTF is the selected transfer function, the DTF creates a new INVITE message and sends it back to the S-CSCF, which in operations 18b and 19b, forwards the INVITE message to the UE 100 via the P-CSCF 118. 120. The emergency callback (or incoming call session portion of the click-to-dial session) establishment is completed in operation 20.

In various example embodiments, the DTF 126 may implement a terminating access domain selection (T-ADS) function in order to select a CS or PS domain for incoming calls. In these instances, the I/S-CSCF 120 routes incoming sessions, including emergency callbacks, to the T-ADS function in the DTF which selects the appropriate domain, such as in the manner described in 3GPP TS 23.237 and TS 23.292 . At the same time, the DTF may also anchor the session for SRVCC purposes, before routing the call back to I/S-CSCF, which when appropriate, may route the incoming session to the EATF 128 to anchor. Thus, for example, in instances in which the T-ADS selects the PS domain, and the I/S-CSCF selects the EATF, the session may be anchored twice.

FIG. 6 now illustrates SRVCC functionality for an emergency call session in the context of the system of FIG. 1, according to example embodiments of the present invention. The SRVCC functionality for an emergency call may be initiated after establishment of the emergency call session has been completed, such as after operation 10 of FIG. 4 or operation 20 of FIG. 5. In operations 21 and 22, the MSC 108 may (alone or via the MME/SGSN 106) initiate a session transfer by sending an INVITE message to the EATF 128, where the message may include a locally-configured E-STN-SR that points toward the serving (visited if roaming) IMS 112. In domain transfer for an emergency session, the MSC may route the INVITE message to the EATF via a visited I-CSCF. In instances in which the UE 100 is registered via normal, non-emergency IMS registration, on the other hand, the INVITE message may include the STN-SR, and may be routed to the DTF 126 via the I/S-CSCF.

In operations 23 and 24, based on the E-STN-SR in the INVITE message, the EATF 128 correlates the request with the anchored session (for example, using a globally-routable user agent uniform resource identifier (GRUU) and/or international mobile equipment identity (IMEI) of the UE 100 as a key). Also in these operations, the EATF determines that access transfer is requested and proceeds with access transfer of the emergency call session with bi-directional speech for the UE. This may include the EATF updating the remote leg with the media description and other information, such as by using a remote leg update procedure similar to that described in 3GPP TS 23.237 (for example, by sending a Re-INVITE message to the I/S-CSCF 120 to update the remote leg). In operation 25, the I/S-CSCF forwards the Re-INVITE message to the PSAP 114, directly or indirectly (for example, via MGCF or MGW). Then, in operation 26, when the session modification procedures are complete, the EATF releases the source access leg (previously-established call control leg between the UE and EATF), such as in the manner described in 3GPP TS 23.237.

Reference is now made to FIG. 7 and subsequently FIGS. 8 and 9 which, again, illustrate control flow diagrams of an IMS emergency call session, callback and SRVCC, respectively, in the context of the system of FIG. 2, according to example embodiments of the present invention. The IMS emergency call session of FIG. 7 may include operations 1, 2, 3 and 4 similar to respective operations 1, 2, 3 and 4 of the IMS emergency call session of FIG. 4. In operation 3 (IMS registration) of FIG. 6, however, the P-CSCF 118 may include the ACTF 130 in IMS registrations—including both normal and emergency registrations. During registration, the ACTF may decide whether to add itself to the path for upcoming call sessions, and if so, during registration, may provide an updated STN-SR that points to the ACTF, such as in the manner described in the aforementioned 3GPP 23.237 CR 0317.

In operation 5, the P-CSCF 118 identifies the INVITE message as being for an emergency call session based on the emergency indication, and in response, forwards the INVITE message to the ACTF 130 in the path set during IMS registration. Then, in operation 6, the ACTF anchors the emergency session (for example, it inserts itself in the signaling path which invokes a third-party call control for enablement of domain transfers for the call). In various instances, the session may be anchored not only at the ACTF but also the DTF 126. In these instances, the DTF may forward the INVITE message to the ACTF via the S-CSCF to anchor the session.

In operation 7, the ACTF selects an E-CSCF 122, creates a new INVITE message and sends it to the selected E-CSCF. The IMS call session of FIG. 7 may then include operations 8, 9 and 10 similar to respective operations 9, 10 and 11 of the IMS call session of FIG. 4, with the E-CSCF selecting and forwarding the INVITE message to an appropriate PSAP 114, and with completion of establishment and subsequent release of the emergency call session.

FIG. 8 illustrates an emergency callback session in the context of the system of FIG. 2, according to example embodiments of the present invention. As shown in FIG. 8, in response to or after release of an emergency call session between a UE 100 and PSAP 114, in operation 11, the PSAP sends a SIP INVITE message with an emergency indication to the UE. In operation 12, an I/S-CSCF 120 receives the INVITE message and identifies it as being for an emergency call session based on the emergency indication, and forwards the INVITE message to the ACTF 130. More particularly, for example, in operation 13, the I/S-CSCF routes the INVITE message to the T-ADS function in the DTF 126 which selects the appropriate domain, CS or PS. In instances in which the T-ADS selects the CS domain, the DTF may forward the INVITE message to the MGCF. Otherwise, in operations 14 and 15, in instances in which the T-ADS selects the PS domain, the DTF forwards the INVITE message back to the I/S-CSCF. The WS-CSCF, in turn, forwards the INVITE message to the ATCF.

In operation 16, the ACTF 130 anchors the emergency session; and in operations 17 and 18, the ACTF creates a new INVITE message and sends it to the UE 100 via the P-CSCF 118. Establishment of the emergency callback session may then be completed in operation 19.

FIG. 9 now illustrates SRVCC functionality for an emergency call session in the context of the system of FIG. 2, according to example embodiments of the present invention. The SRVCC functionality for an emergency call may be initiated after establishment of the emergency call session has been completed, such as after operation 9 of FIG. 7 or operation 19 of FIG. 8. In operation 20, the MSC 108 may (alone or via the MME/SGSN 106) initiate a session transfer by sending an INVITE message to the I-CSCF 120. This INVITE message may include the STN-SR that points to the ATCF 130 in the serving (visited if roaming) IMS 112. Accordingly, in operation 21, the I-CSCF forwards the INVITE message to the ATCF.

In operation 22, based on the STN-SR in the INVITE message, the ATCF 130 correlates the request with the anchored session (for example, using a GRUU and/or IMEI of the UE 100 as a key). Also in this operation, the ATCF determines that access transfer is requested and proceeds with access transfer of the emergency call session with bi-directional speech for the UE. This may include the ATCF updating the remote leg with the media description and other information, such as by using a remote leg update procedure similar to that described in the aforementioned 3GPP 23.237 CR 0317.

In instances in which the DTF 126 is not in the call path, the remote leg may not be updated beyond the ATCF because the ATCF controls the media anchor, for example, the media may be anchored in the ATGW, and the remote end may continue sending a media stream to the ATGW even after the SRVCC. In other instances in which the DTF has anchored the call, the DTF and S-CSCF may be informed on the domain transfer. In these instances, the ATCF may create a new dialog toward S-CSCF and DTF by sending a new INVITE message, and the DTF may release the old dialog. The MSC 108, then, may refresh a registration timer for this call leg.

FIG. 10 is a flowchart illustrating various operations in a method that may be performed by various means of an I/S-CSCF 120, such as by the various means of the apparatus 200 of FIG. 3, in accordance with example embodiments of the present invention. As shown at block 300, the method may include means such as the processor 202 and/or I/O interface 206 receiving a message inviting a UE 100 to participate in an emergency communication session with an originating node. The UE is registered with an Internet Protocol Multimedia Subsystem (IMS). And the originating node comprises a PSAP 114 inviting the UE to participate in an emergency callback session, or an AS 116 inviting the UE to participate in an emergency click-to-dial session.

The method may also include means such as the processor 202 identifying a type of registration of the UE with the IMS, and selecting a transfer function of the IMS—for example, DTF 126 or EATF 128—to anchor the emergency communication session based on the identified type of registration of the UE with the IMS, as shown at blocks 302 and 304. The method may further include means such as the processor and/or I/O interface 206 preparing the message for transmission to the selected transfer function, as shown at block 306.

This enables the selected transfer function to anchor the emergency communication session and further communicate with one or more other components of the IMS to establish the emergency communication session with the UE.

FIG. 11 is a flowchart illustrating various operations in a method that may be performed by various means of an EATF 128, such as by the various means of the apparatus 200, in accordance with example embodiments of the present invention. As shown at block 308, the method may include means such as the processor 202 and/or I/O interface 206 receiving a message inviting a UE 100 to participate in an emergency communication session with an originating node, where the message is received at the EATF from an S-CSCF 120. The method may also include means such as the processor anchoring the emergency communication session at the EATF, as shown at block 310. The method may also include means such as the processor and/or I/O interface preparing the message for transmission back to the S-CSCF to thereby enable the S-CSCF to further communicate with one or more other components of the IMS to establish the emergency communication session with the UE, as shown at block 312.

FIG. 12 is a flowchart illustrating various operations in a method that may be performed by various means of an ATCF 130, such as by the various means of the apparatus 200, in accordance with example embodiments of the present invention. As shown at block 314, the method may include means such as the processor 202 and/or I/O interface 206 receiving a message inviting a PSAP 114 to participate in an emergency communication session with a UE 100. The message is received at the ATCF from a P-CSCF 118 of the IMS. As shown at block 316, the method may also include means such as the processor anchoring the emergency communication session at the ATCF. The method may include means such as the processor and/or I/O interface preparing the message for transmission from the ATCF to an E-CSCF 122, as shown at block 318. This enables the E-CSCF to further communicate with the PSAP directly or via one or more other components of the IMS to establish the emergency communication session with the UE.

According to one aspect of the example embodiments of present invention, functions performed by the apparatus 200, such as those illustrated by the control flow diagrams of FIGS. 4-9 and flowcharts of FIGS. 10-12, may be performed by various means. It will be understood that each block or operation of the control flow diagrams and flowcharts, and/or combinations of blocks or operations in the control flow diagrams and flowcharts, can be implemented by various means. Means for implementing the blocks or operations of the control flow diagrams and flowcharts, combinations of the blocks or operations in the control flow diagrams and flowcharts, or other functionality of example embodiments of the present invention described herein may include hardware, alone or under direction of one or more computer program code instructions, program instructions or executable computer-readable program code instructions from a computer-readable storage medium. In this regard, program code instructions may be stored on a memory device, such as the memory device 204 of the example apparatus, and executed by a processor, such as the processor 202 of the example apparatus. As will be appreciated, any such program code instructions may be loaded onto a computer or other programmable apparatus (for example, processor, memory device, or the like) from a computer-readable storage medium to produce a particular machine, such that the particular machine becomes a means for implementing the functions specified in the control flow diagrams' and flowcharts' block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the control flow diagrams' and flowcharts' block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the control flow diagrams' and flowcharts' block(s) or operation(s).

Accordingly, execution of instructions associated with the blocks or operations of the control flow diagrams and flowcharts by a processor, or storage of instructions associated with the blocks or operations of the control flow diagrams and flowcharts in a computer-readable storage medium, supports combinations of operations for performing the specified functions. It will also be understood that one or more blocks or operations of the control flow diagrams and flowcharts, and combinations of blocks or operations in the control flow diagrams and flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:
1. An apparatus comprising:
at least one processor; and
at least one memory including computer program code, the at least one memory and the computer program code configured to, with the at least one processor, cause the apparatus to at least:

receive a message inviting a user equipment to participate in an emergency communication session with an originating node, the user equipment being registered with an Internet Protocol Multimedia Subsystem (IMS), the originating node comprising a public safety answering point inviting the user equipment to participate in an emergency callback session, or an application server inviting the user equipment to participate in an emergency click-to-dial session, wherein another message inviting the user equipment to participate in the emergency communication session is received in response to an inadvertent release of the emergency communication session;

identify a type of registration of the user equipment with the IMS;

select a transfer function of the IMS to anchor the emergency communication session based on the identified type of registration of the user equipment with the IMS, the selected transfer function comprising a domain transfer function or an emergency access transfer function of the IMS; and prepare the message for transmission to the selected transfer function to thereby enable the selected transfer function to anchor the emergency communication session and further communicate with one or more other components of the IMS to establish the emergency communication session with the user equipment.

2. The apparatus of claim 1, wherein being configured to cause the apparatus to select a transfer function includes being configured to cause the apparatus to select the domain transfer function in an instance in which the user equipment has a normal, non-emergency registration with the IMS.

3. The apparatus of claim 1, wherein being configured to cause the apparatus to select a transfer function includes being configured to cause the apparatus to select the emergency access transfer function in an instance in which the user equipment has an emergency registration with the IMS.

4. The apparatus of claim 3, wherein being configured to cause the apparatus to prepare the message for transmission includes being configured to cause the apparatus to prepare the message for transmission to the emergency access transfer function based on an address of the emergency access transfer function, and wherein the at least one memory and the computer program code are further configured to, with the at least one processor, cause the apparatus to further learn the address of the emergency access transfer function during an emergency registration of the user equipment with the IMS, being configured to cause the apparatus to learn the address including being configured to cause the apparatus to:

receive an emergency registration request from the emergency access transfer function or an emergency call session control function in communication therewith, the emergency access transfer function or emergency call session control function having previously been added to a session path such that the message is routed via the emergency access transfer function or emergency call session control function.

5. A method comprising:

receiving a message inviting a user equipment to participate in an emergency communication session with an originating node, the user equipment being registered with an Internet Protocol Multimedia Subsystem (IMS), the originating node comprising a public safety answering point inviting the user equipment to participate in an emergency callback session, or an application server inviting the user equipment to participate in an emergency click-to-dial session, wherein another message inviting the user equipment to participate in the emergency communication session is received in response to an inadvertent release of the emergency communication session;

identifying a type of registration of the user equipment with the IMS;

selecting a transfer function of the IMS to anchor the emergency communication session based on the identified type of Registration of the user equipment with the IMS, the selected transfer function comprising a domain transfer function or an emergency access transfer function of the IMS; and preparing the message for transmission to the selected transfer function to thereby enable the selected transfer function to anchor the emergency communication session and further communicate with one or more other components of the IMS to establish the emergency communication session with the user equipment.

6. The method of claim 5, wherein selecting a transfer function comprises selecting the domain transfer function in an instance in which the user equipment has a normal, non-emergency registration with the IMS.

7. The method of claim 5, wherein selecting a transfer function comprises selecting the emergency access transfer function in an instance in which the user equipment has an emergency registration with the IMS.

8. The method of claim 7, wherein preparing the message for transmission comprises preparing the message for transmission to the emergency access transfer function based on an address of the emergency access transfer function, and wherein the method further comprises learning the address of the emergency access transfer function during an emergency registration of the user equipment with the IMS, learning the address including:

receiving an emergency registration request from the emergency access transfer function or an emergency call session control function in communication therewith, the emergency access transfer function or emergency call session control function having previously been added to a session path such that the message is routed via the emergency access transfer function or emergency call session control function.

9. A non-transitory computer-readable storage medium having computer-readable program code portions stored therein, the non-transitory computer-readable storage medium and computer-readable program code portions being configured to, with at least one processor, cause an apparatus to at least:

receive a message inviting a user equipment to participate in an emergency communication session with an originating node, the user equipment being registered with an Internet Protocol Multimedia Subsystem (IMS), the originating node comprising a public safety answering point inviting the user equipment to participate in an emergency callback session, or an application server inviting the user equipment to participate in an emergency click-to-dial session, wherein another message inviting the user equipment to participate in the emergency communication session is received in response to an inadvertent release of the emergency communication session;

identify a type of registration of the user equipment with the IMS;

select a transfer function of the IMS to anchor the emergency communication session based on the identified type of registration of the user equipment with the IMS, the selected transfer function comprising a domain transfer function or an emergency access transfer function of the IMS; and prepare the message for transmission to the selected transfer function to thereby enable the selected transfer function to anchor the emergency communication session and further communicate with one or more other components of the IMS to establish the emergency communication session with the user equipment.

10. The computer-readable storage medium of claim 9, wherein being configured to cause the apparatus to select a transfer function includes being configured to cause the apparatus to select the domain transfer function in an instance in which the user equipment has a normal, non-emergency registration with the IMS.

11. The computer-readable storage medium of claim 9, wherein being configured to cause the apparatus to select a transfer function includes being configured to cause the apparatus to select the emergency access transfer function in an instance in which the user equipment has an emergency registration with the IMS.

12. The computer-readable storage medium of claim 11, wherein being configured to cause the apparatus to prepare the message for transmission includes being configured to cause the apparatus to prepare the message for transmission to the emergency access transfer function based on an address of the emergency access transfer function, and wherein the computer-readable storage medium and computer-readable program code portions are further configured to, with the at least one processor, cause the apparatus to further learn the address of the emergency access transfer function during an emergency registration of the user equipment with the IMS, being configured to cause the apparatus to learn the address including being configured to cause the apparatus to:

receive an emergency registration request from the emergency access transfer function or an emergency call session control function in communication therewith, the emergency access transfer function or emergency call session control function having previously been added to a session path such that the message is routed via the emergency access transfer function or emergency call session control function.

* * * * *